UNITED STATES PATENT OFFICE.

CARL BACHE-WÜG, OF BERLIN, NEW HAMPSHIRE, ASSIGNOR OF ONE-HALF TO BERLIN MILLS COMPANY, OF PORTLAND, MAINE, A CORPORATION OF MAINE.

METHOD OF PREPARING WOOD-PULP.

1,169,597.  Specification of Letters Patent.  Patented Jan. 25, 1916.

No Drawing.  Application filed December 14, 1912.  Serial No. 736,705.

*To all whom it may concern:*

Be it known that I, CARL BACHE-WÜG, a citizen of the United States, residing at Berlin, in the county of Coos and State of New Hampshire, have invented an Improvement in Methods of Preparing Wood-Pulp, of which the following is a specification.

This invention relates to a process for treating wood for the production of a white ground wood pulp for paper, which can be used without admixture with it of any sulfite, and newspaper of a good quality produced, or it may be mixed with sulfite or used as a mixer in a strong wrapping paper, Manila paper or bag-paper, and is intended as an improvement upon the process forming the subject-matter of Letters Patent #913,679, dated March 2, 1909.

My present invention consists in confining the wood, in the form of blocks, in a digester, then withdrawing the air from them, thereby producing in the digester a vacuum, or more strictly speaking, a partial vacuum, then pressing in sulfurous gas, such as sulfur dioxid ($SO_2$) to bleach the outer portions of the blocks, and to soften but not dissolve or destroy the ligninous matter; then injecting water and cooking the mass, which results in further softening but not dissolving or destroying the ligninous matter which is contained in the outer portion of the blocks; or in lieu of injecting water injecting a solution of sodium chlorid (NaCl) and cooking the mass, which results in still further softening but not dissolving or destroying the ligninous matter which is contained in the outer portions of the blocks; or, in lieu of injecting a solution of sodium chlorid, injecting a bisulfite liquor and cooking the mass, which results in producing a high grade of pulp, but the ligninous matter will not be saved to the same extent as when a solution of sodium chlorid or water is employed, and the yield will be correspondingly less; or in lieu thereof injecting a bisulfite liquor and cooking the mass for a few hours, say four or five hours, then blowing off the bisulfite liquor and injecting a sodium chlorid solution and further cooking the mass, which results in a larger yield than when cooking the mass in a bisulfite liquor alone, and the fiber is strong and the color white; and then grinding the blocks in any usual or suitable manner, thereby producing a mixture of treated and untreated fibers. The pulp thus produced is well adapted as a substitute for a mixture of ground wood and sulfite.

By withdrawing the air from the blocks the bleaching and softening gas will be permitted to come in intimate contact with the fibers forming the outer portions of the blocks to a substantial depth, and in such manner as to bleach them and to soften but not destroy the ligninous matter by which the fibers are naturally bound together. The sulfurous or other gas may be pressed in, say for one or two hours, which is usually sufficient. The solution of sodium chlorid may be of any degree of concentration and when employed the mass will be cooked for say six or seven hours, which is usually sufficient, although it may be cooked for a longer or shorter period of time, according to the quality or grade of pulp which it is desired to produce. A finer quality of pulp will be produced by a longer cooking of the mass. The sodium chlorid when associated with the sulfur dioxid at a high temperature while the mass is being cooked results in the formation of a salt, which, while aiding in softening and bleaching, prevents the discoloration of the inner portions of the blocks, so that said inner portions are of a natural color or even whiter, instead of being darkened as has heretofore been the case in all processes known to me where the outer portions of the blocks are treated and the inner portions thereof are left untreated, and as a result a high grade of pulp may be produced as contrasted with a low grade. The power required to grind the blocks thus treated is much less than is usually required to grind the blocks of wood and the time required for the grinding operation is also less.

I claim:—

1. The herein described process of preparing wood pulp for paper which consists in confining the wood, in the form of blocks, in a digester, withdrawing the air from them, and while the air is withdrawn from them pressing into them for a substantial depth a gas by which the outer portions thereof are bleached and the ligninous matter softened but not destroyed, then injecting a pulp-forming liquor and cooking the mass, whereupon a salt is formed by the association of the pulp forming liquor and gas which aids in softening and bleaching and prevents discoloration of the fibers at the inner portions of the blocks and then grinding up the blocks.

2. The herein described process of preparing wood pulp for paper, which consists in confining the wood, in the form of blocks, in a digester, withdrawing the air from them, and while the air is withdrawn from them pressing into them for a substantial depth sulfur dioxid by which the outer portions thereof are bleached and the ligninous matter softened but not destroyed, then injecting a pulp-forming liquor and cooking the mass, whereupon a salt is formed by the association of the pulp forming liquor and sulfur dioxid which aids in softening and bleaching, and prevents discoloration of the fibers at the inner portions of the blocks and then grinding up the blocks.

3. The herein described process of preparing wood pulp for paper which consists in confining the wood, in the form of blocks, in a digester, withdrawing the air from them, and while the air is withdrawn from them pressing into them for a substantial depth a gas by which the outer portions thereof are bleached and the ligninous matter softened but not destroyed, then injecting a solution of sodium chlorid and cooking the mass, whereupon a salt is formed by the association of the sodium chlorid and gas which aids in softening and bleaching, and prevents discoloration of the fibers at the inner portions of the blocks and then grinding up the blocks.

4. The herein described process of preparing wood pulp for paper which consists in confining the wood, in the form of blocks, in a digester, withdrawing the air from them, and while the air is withdrawn from them pressing into them for a substantial depth sulfur dioxid by which the outer portions thereof are bleached and the ligninous matter softened but not destroyed, then injecting a solution of sodium chlorid and cooking the mass, whereupon a salt is formed by the association of the sodium chlorid and sulfur dioxid which aids in softening and bleaching, and prevents discoloration of the fibers at the inner portions of the blocks and then grinding up the blocks.

5. The herein described process of preparing wood pulp for paper which consists in confining the wood in the form of blocks in a digester, pressing into them for a substantial depth a gas by which the outer portions thereof are bleached and the ligninous matter softened but not destroyed, then injecting a pulp-forming element and cooking the mass, said pulp-forming element by association with the gas when the mass is heated to a high temperature forming a salt which prevents discoloration of the fibers at the inner portions of the blocks and then grinding up the blocks.

6. The herein described process of preparing wood pulp for paper which consists in confining the wood in the form of blocks in a digester, pressing into them for a substantial depth sulfur dioxid by which the outer portions thereof are bleached and the ligninous matter softened but not destroyed, then injecting a solution of sodium chlorid and cooking the mass, whereupon a salt is formed by the association of the sodium chlorid and sulfur dioxid which prevents discoloration of the fibers at the inner portions of the blocks and then grinding up the blocks.

7. The herein described process of preparing wood pulp for paper which consists in confining the wood, in the form of blocks, in a digester, withdrawing the air from them, pressing into them for a substantial depth a gas by which the outer portions thereof are bleached and the ligninous matter softened but not destroyed, then injecting a bisulfite liquor and cooking the mass, then blowing off the bisulfite liquor, then injecting a sodium chlorid solution and cooking the mass and then grinding up the blocks.

In testimony whereof, I have signed my name to this specification, in the presence of two subscribing witnesses.

CARL BACHE-WÜG.

Witnesses:
  Wm. H. Paine,
  E. McCourt Macy.

It is hereby certified that the name of the patentee in Letters Patent No. 1,169,597, granted January 25, 1916, for an improvement in "Methods of Preparing Wood-Pulp," was erroneously written and printed as "Carl Bache-Wüg," whereas said name should have been written and printed as *Carl Bache - Wiig;* and that the said Letters Patent should be read with this correction therein that the same may conform to the record of the case in the Patent Office.

Signed and sealed this 3rd day of July, A. D., 1917.

[SEAL.]

F. W. H. CLAY,
*Acting Commissioner of Patents.*

Cl. 92—11.